United States Patent [19]
Ellis

[11] Patent Number: 6,116,833
[45] Date of Patent: Sep. 12, 2000

[54] SELF-SEALING REINFORCEMENT TIE ROD FOR VENTILATING DUCTS

[76] Inventor: Stanley J. Ellis, 2602 Courtland St., Orange, Calif. 92667

[21] Appl. No.: 09/307,270

[22] Filed: May 7, 1999

[51] Int. Cl.[7] .............................. F16B 35/00; F16B 35/02; F16L 9/00

[52] U.S. Cl. ......................... 411/384; 411/369; 411/389; 411/546; 138/172

[58] Field of Search .................................... 411/383, 384, 411/389, 367, 369, 546; 138/172

[56] References Cited

U.S. PATENT DOCUMENTS

| | | | |
|---|---|---|---|
| 2,934,684 | 4/1960 | Fegan | 411/546 X |
| 5,251,993 | 10/1993 | Sigourney | 411/384 X |
| 5,551,722 | 9/1996 | Schwartz | 411/546 X |

FOREIGN PATENT DOCUMENTS 461094  2/1937  United Kingdom ................... 411/389

*Primary Examiner*—Neill Wilson
*Attorney, Agent, or Firm*—William L. Chapin

[57] ABSTRACT

A tie rod for reinforcing heating, ventilating and air conditioning (HVAC) ducts against excessive wall flexure in response to positive and/or negative static or dynamic pressure differentials between the interior and exterior of the duct includes a threaded steel rod having a pair of abutment structures irrotatably fastened to longitudinally opposed end portions of the rod. Each abutment structure has a central coaxial bore which receives the rod, and includes a tubular portion terminated at an outer longitudinal end thereof by a transversely disposed, radially outwardly protruding annular flange. The bore wall of the abutment structure's tubular portion flares in an arcuate curve radially and axially outwardly to join the outer transverse wall surface of the flange, forming a tapered annular cavity between the bore wall and the end portion of the threaded rod protruding out from the abutment structures. An O-ring is slipped over each end portion of the threaded rod, the rod placed within a duct, and opposed ends of the rod inserted into respective ones of a pair of perpendicularly aligned perforations provided through opposed walls of the duct. A separate one of a pair of flare nuts is then tightened down onto the outer surface of each duct wall, compressing the O-ring between the inner surface of the duct wall and the outer transverse flange wall of the abutment structure, thus causing the O-ring to cold flow partially into the tapered annular cavity, and thereby forming a highly effective hermetic seal of each duct wall perforation.

25 Claims, 3 Drawing Sheets

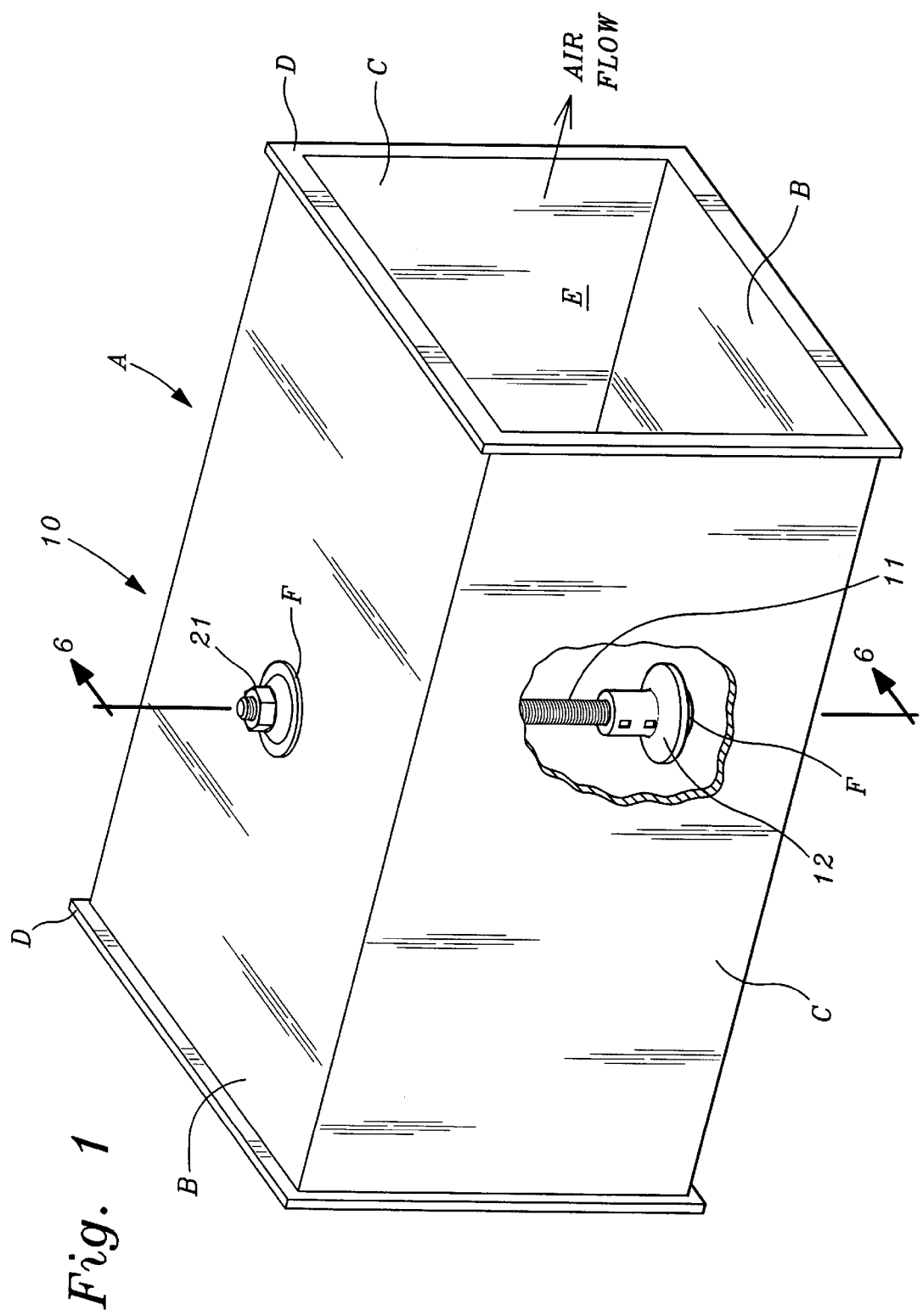

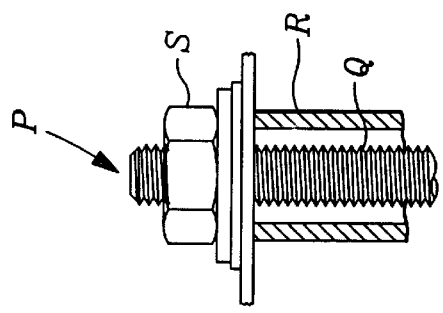
Fig. 2C (PRIOR ART)
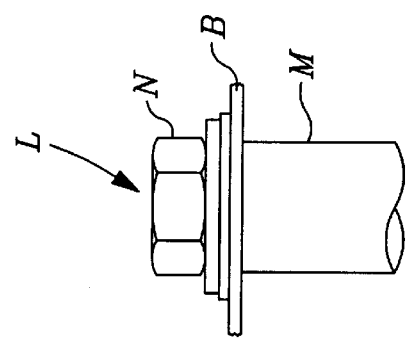
Fig. 2B (PRIOR ART)
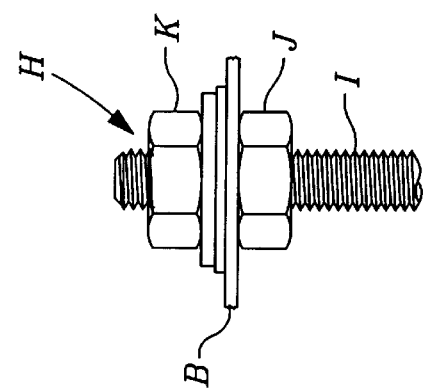
Fig. 2A (PRIOR ART)
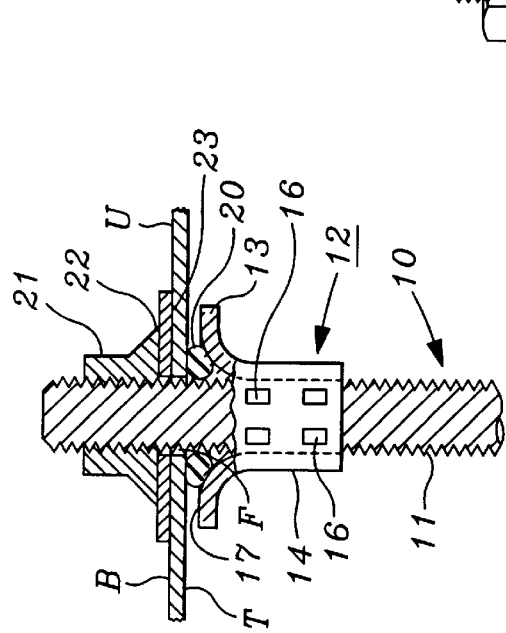
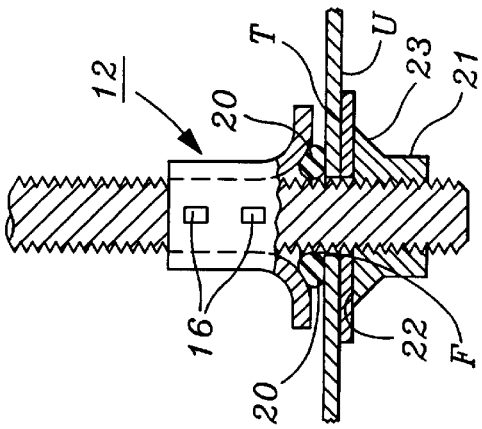
Fig. 6

SELF-SEALING REINFORCEMENT TIE ROD FOR VENTILATING DUCTS

BACKGROUND OF THE INVENTION

A. Field of the Invention

The present invention relates to the reinforcement of ventilating ducts of the type used to convey air for heating, ventilating or air conditioning (HVAC) the interior space of a building. More particularly, the invention relates to an improved tie rod fastener for preventing excessive flexure of duct walls in response to fluctuations of air pressure exerted on walls of the duct.

B. Description of Background Art

Ductwork used to heat, ventilate, or air condition buildings usually consists of elongated lengths of tubing comprising individual duct sections which are coupled together to form a continuous, air-tight duct for conveying flowing air. Typical duct tubing is made of a material such as sheet metal which is relatively strong but sufficiently light in weight to minimize the size and weight of fasteners and structural components required to support the ductwork, as well as maintaining materials and fabrication costs of the ductwork itself at reasonable levels. Thus, typical ducts are made of relatively thin sheet steel ranging in size from 26 gauge (0.0188 inch thick) to 16 gauge (0.0625 inch thick).

Sheet metal ducts have rectangular, circular or oval cross section shapes, and are often manufactured and supplied in pre-cut lengths or sections with transversely outwardly protruding interconnection flanges provided at opposite longitudinal ends of the section, to facilitate interconnecting duct sections at a job site and thus forming air conveying ducts of desired lengths and orientations.

Ducts of the type described above are available in a wide variety sizes of, having cross-section dimensions which range from a few inches to several feet. Moreover, a wide range of width-to-height or aspect ratios of rectangular ducts are available. For example, a typical 18 inch high duct may have a width in the range of 2 feet to 4 feet, and a length of 5 feet. Whatever the shape, size and aspect ratio of the duct, the relatively small thickness of its walls relative to its cross-sectional dimensions results in the duct walls being relatively flexible. Thus, conventional ducts may experience relatively large, possibly destructive deformations if static or dynamic differential air pressure between the interior and exterior of the duct exceeds pre-determined threshold values. For this reason, mechanical engineering standards as well as applicable building codes require that duct work used to conduct air in certain heating, ventilating, and air conditioning (HVAC) applications be reinforced against expansion when positively pressurized and/or against collapse when negatively pressurized.

A widely employed reinforcement method that meets code requirements consist of installing elongated straight, rigid reinforcement members within a duct at pre-determined spacings which depend upon the rigidity of the duct, and upon the maximum differential pressures which it may encounter. Such reinforcement members are disposed perpendicularly between inner surfaces of opposite walls of the duct and fastened at opposite ends thereof to those walls. One such approved reinforcement member which is in current use consists of a threaded steel tie rod which has installed onto each end thereof a first, inner nut which is threadingly advanced to a predetermined distance inward from the end of the rod. The distance between the outer faces of the inner nuts is made equal to the minimum cross-sectional dimension, i.e., the height of the duct. The tie rod is next positioned perpendicularly between a pair of opposed walls of the duct, and opposite ends of the threaded rod are each inserted into a separate one of a pair of transversely or vertically aligned holes provided through the duct walls. A pair of external nuts are then threaded onto the opposite ends of the threaded rod which protrude through the duct wall holes. Each external nut is then tightened onto the threaded rod against the outer surface of the duct wall, while the adjacent inner nut is held against rotation with a separate wrench. For large ducts, this operation requires two workmen.

Another prior-art duct reinforcement uses an elongated tube containing in opposite ends of the bore openings thereof an internally threaded fastener member which is fixed in the tube and which is adapted to receive a machine screw inserted through a duct wall hole. This reinforcement method also sometimes requires that the tube being gripped while the external machine screw is torqued, which again may require two workmen.

A third type of prior art tie rod used to reinforce HVAC ducts, which is a variation of the first method, uses a tube which encloses a threaded rod, the latter being secured between the walls of the duct by two external nuts, and is no easier to install than the other two types described above.

In addition to being somewhat difficult and time consuming to install, in accordance with certain code requirements, prior art reinforcement tie rods of the type discussed above must make an air-tight seal with the duct wall holes through which they protrude, thus requiring installation of a resilient sealing element such as a gasket or washer between the exterior nut or screw head and the duct wall. If the exterior nut or screw is torqued too tightly, such resilient elements can be deformed or damaged, and may ultimately fail to achieve sealing. Patents known to the present inventor which are related to reinforcement or sealing members that may have applicability to the field of the present invention include the following United States patents:

- Augustin, U.S. Pat. No. 3,009,722, Nov. 21, 1961, Sealing And Retaining Ring
- Jones et al., U.S. Pat. No. 3,343,440, Oct. 18, 1965, Self-Locking Two-Piece Fastening Device
- Savage, U.S. Pat. No. 3,557,838, Jan. 26, 1971, Duct Stiffener
- Yonkers, U.S. Pat. No. 3,606,357, Sep. 20, 1972, Self-Sealing And Aligning Member
- Yamaguchi et al., U.S. Pat. No. 3,776,253, Dec. 4, 1973, Means For Preventing Deformation Of Steel Tubes
- Puklus, Jr., U.S. Pat. No. 3,878,757, Apr. 22, 1975, Automatic Locking Sliding Nut
- Freeman, U.S. Pat. No. 4,249,578, Feb. 22, 1981, Length-Adjustable Stiffener For Fiberboard Ducts
- Kowalski, U.S. Pat. No. 4,634,327, Jan. 6, 1987, Fastening Device For Attachment To A Threaded Rod
- Arav, U.S. Pat. No. 4,671,546, Jun. 9, 1987, Sealing Device For Securing Device Extending Through Fluid Container
- Hunter, U.S. Pat. No. 5,253,901, Oct. 19, 1993, Duct Reinforcement
- Elder, U.S. Pat. No. 5,660,212, Aug. 26, 1997, Integral HVAC Reinforced Duct System And Method For Reinforcing Duct None of the foregoing references discloses or suggests structures or methods which might overcome the limitations of prior art tie rod fasteners of the type discussed above. In view of the aforementioned limitations of existing tie rod fasteners, the present convention was conceived of.

OBJECTS OF THE INVENTION

An object of the present invention is to provide a reinforcement tie rod for installation in perforations provided in opposed walls of an HVAC duct, which includes members internal to the duct which are effective in producing an air-tight seal between the fastener and wall perforations.

Another object of the invention is to provide a self-sealing reinforcement tie rod for HVAC ducts which uses resilient sealing elements located within the duct.

Another object of the invention is to provide a self-sealing reinforcement tie rod for HVAC ducts which includes an external threaded fastening member which may be tightened onto the tie rod, without requiring access to the interior of the duct.

Another object of the invention is to provide a self-sealing reinforcement tie rod for HVAC ducts which seals both the anchoring holes in the duct walls and the surface of an elongated member which spans the distance between the walls of the duct.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved tie rod for reinforcing ducts, of the type used in HVAC applications, to prevent excessive flexure of the duct walls in response to positive and/or negative static or dynamic pressure differentials between the interior and exterior of the duct.

A reinforcement tie rod according to the present invention includes a length of threaded steel rod which is about 1¼ inches longer than the height of ducts which the tie rod is intended to reinforce. Thus, for use in 12-inch high ducts, the threaded rod portion of the tie rod according to the present invention may have a typical diameter of about ⅜-inch and a length of about 13¼ inches. The tie rod according to the present invention includes a pair of abutment structures fastened to opposite end portions of the threaded rod, inwards of the outer transverse end walls of the rod. Each abutment structure includes a longitudinally inwardly located tubular part which receives the threaded rod, and is permanently fastened thereto by, for example, crimping the wall of the tubular section into the threads of the rod. Each abutment structure also includes a longitudinally outwardly located annular flange which is disposed transversely to the axis of the threaded rod. The longitudinal spacing between the outer transverse walls of the abutment structure flanges is made nearly equal to the height of the duct. Thus, when the rod is placed inside a duct and opposite ends of the rod are inserted into a pair of vertically aligned holes made in the upper and lower walls of the duct, the outer transverse surfaces of the abutment structure flanges are proximate the inner duct wall surfaces, and each end of the rod protrudes about ⅝-inch outward from the adjacent duct walls.

According to the invention, the outer longitudinal portion of the bore in the tubular part of each abutment structure flares arcuately outwardly to join the outer transverse flange wall of the abutment structure, forming an annular cavity between the flange wall surface and threaded rod. The cavity has a diameter which tapers smoothly radially and longitudinally outwardly towards the flange. Prior to installation of the tie rod in a duct, a pair of resilient O-ring rings having an inner diameter slightly less than that of the threaded rod are slipped onto opposite outer ends of the rod.

The tie rod according to the present invention includes a pair of internally threaded fasteners located externally to the duct, which are threaded onto opposite ends of the threaded rod which protrude outwardly through the duct walls. In the preferred embodiment, each external threaded fastener consists of a flare nut having an outer hexagonal head and an inner annular skirt flange which flares outwardly from the head, the skirt having a flat lower or inner surface. When the flare nut is threaded down onto the protruding length of the threaded rod, and tightened down onto the outer surface of a duct wall, the O-ring is compressed between the inner surface of the duct wall and the outer transverse wall of an abutment structure flange. Further tightening of the flange nut on the threaded rod causes the O-ring to cold flow partially into the arcuately curved annular cavity between the flange wall and rod, and against the outer cylindrical wall surface of the threaded rod, thus forming a highly effective hermetic sealing of the hole through the duct wall. Moreover, since the coefficient of friction between the inner transverse surface of the O-ring and the outer surface of the abutment structure flange, as well as that between the outer transverse wall of the O-ring and the inner surface of the duct wall, are substantially larger than that between the flare nut flange and the outer duct wall surface, it has been found possible to torque the flare nut tightly onto the threaded rod, without having to grasp any portion of the rod within the duct.

BRIEF DESCRIPTION OF THE DRAWINGS

FIG. 1 is a perspective view of an air conveying duct used in HVAC applications and having installed therein a self-sealing reinforcement tie rod according to the present invention.

FIG. 2 is an elevation view of prior art tie rods used to reinforce HVAC ducts, in which FIG. 2A shows a threaded rod, FIG. 2B shows a tube with internally threaded inserts, and FIG. 2C shows a threaded rod and unthreaded tube.

FIG. 6 is a sectional view of the structure of FIG. 1, showing the tie rod thereof secured to duct walls.

DESCRIPTION OF THE PREFERRED EMBODIMENTS

Figure 3:
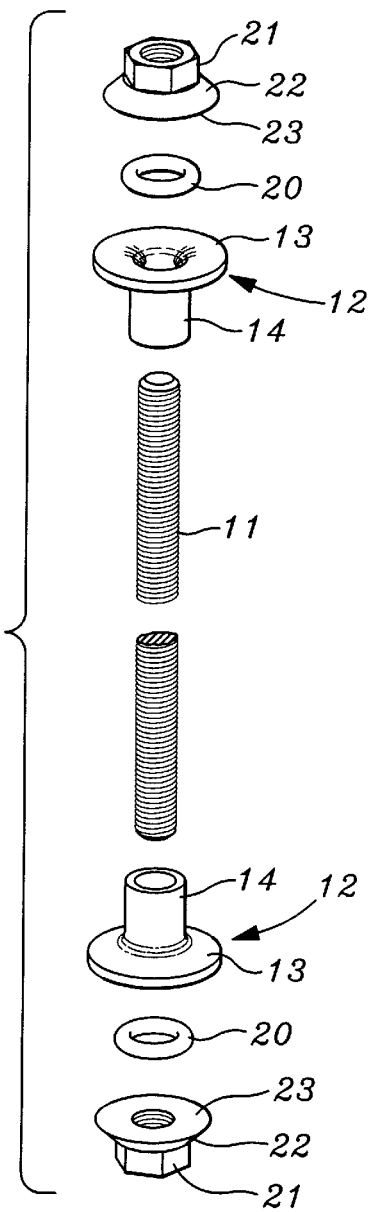
FIG. 3 exploded view of the tie rod of FIG. 1, on a somewhat enlarged scale and showing flange tubes of abutment structures comprising part of the tie rod of FIG. 1, prior to their being crimped to a threaded rod.

FIGS. 1 and 3–illustrate a self-sealing reinforcement tie rod according to the present invention, while FIG. 2 illustrates prior art tie rods.

Referring first to FIG. 1, a tie rod 10 according to the present invention is shown installed in a duct (A) of the type used to convey air for heating, ventilating or air conditioning (HVAC) a building or other structure. Duct (A) is typically fabricated from a length of galvanized sheet steel stock which is roll formed into an elongated tube having a circular, oval or rectangular cross section, as shown in FIG. 1, longitudinal margins of the sheet being joined together by a folded seam or welded lap joint (not shown) to enclose the interior space of the tube. As shown in FIG. 1, duct (A) has upper and lower longitudinally elongated rectangular walls (B) and a pair of laterally opposed, longitudinally elongated rectangular side walls (C). Duct (A) may optionally be provided at opposite longitudinal ends thereof with transversely disposed rectangular ring-shaped flanges (D) comprised of thin rectangular ribs which flare perpendicularly outwards from the transverse ends of duct perimeter walls (B) and (C), away from bore (E) of the duct. Flanges (D) are provided to facilitate fastening together a plurality of duct sections to provide an air duct of a desired length.

As may be seen best by referring to FIG. 6 in addition to FIG. 1, upper and lower walls (B) of duct (A) have formed through their thickness dimension a pair of vertically aligned perforations (F) which are located laterally midway between side walls (C) and longitudinally midway transverse end walls (D). As is also shown in those figures, tie rod 10 includes an elongated threaded rod 11 which has fastened near opposite longitudinal ends thereof a pair of opposed abutment structures 12. Opposite ends of threaded rod 11 protrude through perforations (F) outwardly from duct walls (B), and are secured thereto by a pair of flange nuts 21. A detailed description of the novel structure and functional characteristics of tie rod 10 is given below, after the following description of certain aspects of prior art fasteners which will make advantages of the present invention more clear.

As shown in FIG. 1 and described above, reinforcement tie rod 10 is fastened between the two largest area walls or panels (B) of duct (A) at the geometric center of the panels. Reinforcement tie rods located in this manner are referred to as Mid Panel Tie Rods (MPT), and in accordance with standards promulgated by the Sheet Metal And Air Conditioning Contractors National Association, Inc. (SMACNA), 4201 Lafayette Center Drive, Chantilly, Va. 20151-1209, in a publication titled *HVAC Duct Construction Standards, Second Edition* 1998. Standards in that manual specify that ducts of a certain size, metal gauge, and pressurization be provided with reinforcement members, which may consist of a single mid panel tie rod (MPT), two or more laterally spaced apart MPT's and/or a Joint Tie Rod (JTR) positioned near the flange joint of a duct section. Reinforcement tie rods approved in the SMACNA manual are depicted in FIG. 2. Thus, FIG. 2A illustrates a first prior art reinforcement tie rod (H) for HVAC ducts which consists of a threaded rod (I) secured at opposite ends thereof between a pair of duct panels (B) by a pair of inner nuts (J) and a pair of outer nuts (K). FIG. 2B illustrates a second prior art reinforcement tie rod (L) which consists of a tube (M) which has a pair of internally threaded inserts driven into opposite ends of the tube bore, into which machine screws or bolts (N) are tightened to secure the tie rod between a pair of duct walls (B).

FIG. 2C illustrates a third type of approved prior art tie rod installation (P), which employs a threaded rod (Q) enclosed by a coaxial tube (R) and secured to duct panels (B) by a pair of external nuts (S).

FIGS. 3–6 illustrate details of the construction and installation of the self-sealing duct reinforcement tie rod 10 according to the present invention. Referring first to FIG. 3, it may be seen that tie rod 10 includes a length of rod 11 made of a durable material such as steel and which is externally threaded. As will be explained below, the center longitudinal portion of the rod need not be provided with threads, since only the outer longitudinal portions of the rod require utilization of threads. However, since tie rods 10 it would be desirable to make in a variety of lengths for use in ducts of various heights, cost effective manufacture of tie rods 10 preferably utilizes long lengths of continuously threaded rod stock which are cut to length.

As shown in FIG. 1, threaded rod 11 is cut to a length which causes opposite ends of the rod to protrude sufficiently far through vertically aligned holes (F) formed through upper and lower walls (B) of duct (A) to receive flange nuts 21 used to fasten the tie rod to the duct. In an example embodiment, threaded steel rod 11 had a diameter of about ⅜-inch (0.375"), and a length of about 13¼ inch, for use in ducts having a height of 12 inches. With tie rod 10 having these dimensions and installed in a 12-inch high duct, opposite end portions of threaded rod 11 protruded about ⅝-inch outward from the duct walls.

Referring again to FIGS. 3 and 5, it may be seen that each of the pair of abutment structures 12 that are ultimately fastened to opposite ends of threaded rod 11 has the appearance of a stove pipe hat, including an annular brim or flange section 13 and a coaxial tubular crown section 14 of smaller diameter which protrudes longitudinally away from the flange section. Abutment structure 12 has a smooth central coaxial bore 15, which has an internal diameter slightly larger than the outer diameter of threaded rod 11. In an example embodiment using a rod 11 having an O.D. of ⅜-inch (0.375"), bore 15 of abutment structure 12 had an I.D. of 0.380 inch.

As may be seen best by referring to FIGS. 1 and 6, bores 15 of abutment structures 12 insertably receive opposite ends of threaded rod 11, and are permanently secured to the rod. In a preferred embodiment, the external cylindrical wall surface 14A of tubular section 14 has formed therein a plurality of crimps 16. The crimps deform the inner corresponding portions of cylindrical wall surface 14B of the tubular section radially inwardly sufficiently far to flow into grooves between threads of threaded rod 11, thus permanently and tightly securing the abutment structure to the threaded rod.

In the course of developing the aforementioned crimping attachment method, it was found that too many crimps 16 would unduly deform abutment structure 12, while too few would not secure the abutment structure with sufficient strength to remain attached to the rod when external flange nuts 21 were torqued onto the rods. Thus, it was found that a suitable arrangement and number of crimps 16 consisted of a first pair of longitudinally spaced apart, axially aligned crimps near opposite longitudinal ends of tubular section 14, and two additional similar pairs of crimps at opposite sides of a location diametrically opposed to the alignment axis of the single pair of crimps. This arrangement is depicted in FIG. 6, in which a single pair of crimps 16 is shown on the front side of lower tubular section 12, while a double pair of crimps is shown on front side of upper tubular section 12.

Figure 4:
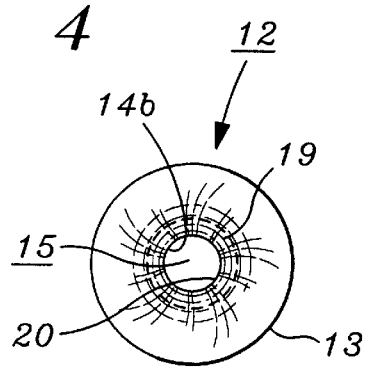
FIG. 4 is an upper plan view of an abutment structure of FIG. 3, also on a somewhat enlarged scale.
Figure 5:
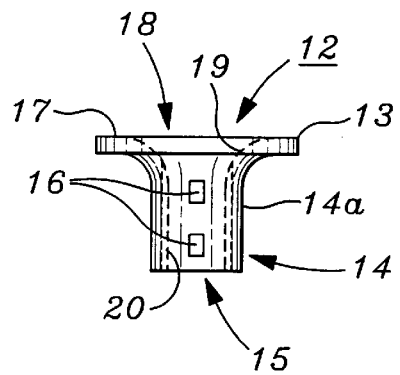
FIG. 5 is a front elevation view of the structure of FIG. 3.

As may be seen best by referring to FIGS. 4 and 5, annular flange section 13 of abutment structure 12 has formed in the outer transverse wall 17 thereof a circularly symmetric central annular depression 18 which has an arcuately curved wall surface 19 which joins the outer transverse wall surface to the inner cylindrical wall surface 14B of the tubular section 14 of the abutment structure. As shown in FIG. 6, arcuately curved wall surface 19 of abutment structure flange 13 forms with the outer cylindrical surface of threaded rod 11 an annular cavity which tapers radially and axially outwardly from bore 15 of the abutment structure towards outer transverse wall 17 of the flange.

Referring now to FIG. 3, it may be seen that reinforcement tie rod 10 according to the present invention includes a pair of O-rings 20 made of a resilient material such as synthetic rubber, which are slipped over opposite ends of threaded rod 11 after abutment structures 12 have been crimped onto the rod, and before the tie rod is installed in a duct. O-rings 20 have an inner diameter of slightly less than the outer diameter of threaded rod 11, so the O-rings may be pre-installed on a rod without falling off the ends thereof. In an example embodiment, O-rings 20 used with threaded rod 11 having a ⅜-inch (0.375") O.D. had an I.D. of 0.360.

As shown in FIGS. 1 and 6, tie rod 10 is secured to duct walls B by a pair of flange nuts 21 which have a downwardly depending flange or skirt 22. Flange nuts 21 are threaded onto ends of threaded rod 11 which protrude through vertically aligned perforations (F) through the duct wall. When flange nuts 21 are loosely tightened onto opposite ends of threaded rod 11, each O-ring 20 is compressed between the inner wall surface (T) and outer transverse wall surface 17 of abutment structure flange section 13. Further tightening of flange nuts 21 on threaded rod 11 causes each O-ring 20 to cold flow partially into depression 18 in the outer opening of flange section 13, between inner wall surface (T) of duct wall (B) and arcuately curved wall 19 of the depression, as well as against the outer cylindrical wall surface of threaded rod 11, thus forming a highly effective hermetic seal of perforation (F). Moreover, since the coefficient of friction between O-ring 20, abutment structure flange wall 17, and inner duct wall surface (T) is substantially larger then that between the lower surface 23 of nut flange 22 and outer wall surface (U) of the duct wall, it has been found possible to torque nut 21 tightly on threaded rod 11, without having to grip any portion of rod 11 within the internal space (E) of duct (A). This is an important advantage over prior art tie rods, which generally require that such tie rods be held internally during tightening, sometimes requiring the assistance of a second workman In the embodiment of a self-sealing reinforcement tie rod 10 according to the present invention and described above, abutment structure 12 has a smooth bore 15. This construction allows the abutment structure to be readily slipped over the ends of rod 11 to a distance which may be set by a jig, and crimped to the rod, thus facilitating high volume factory manufacture of tie rods 10. In an alternate embodiment, bore 15 of abutment structures 12 may be internally threaded. Thus constructed, the abutment structure may readily be screwed onto the ends of threaded rod 11 to a desired spacing at a job site, and crimped onto the rod by a portable crimping tool which does not require use of a spacing jig.

What is claimed is:

1. A reinforcement tie rod for restraining relative movement between a pair of opposed walls of a ventilating duct, said walls being provided with a pair of opposed perpendicularly aligned holes therethrough, said reinforcement tie rod comprising;

a. an elongated rod having opposed longitudinal ends adapted to be received through respective ones of said perpendicularly aligned holes provided through said duct walls and protrude outwardly therefrom, b. a pair of abutment structures fastened to said respective opposite longitudinal end portions of said rod, each of said abutment structures having a flange including an outer transverse flange wall adapted to abut an inner wall surface of one of said opposed duct walls, the spacing between said outer transverse surfaces of said flange walls approximating that of said perpendicular spacing between said duct walls, said abutment structure including a tubular portion located longitudinally inwardly of said flange, said tubular portion having a bore which extends through said flange and receives therethrough said rod, and c. a pair of external fasteners, a separate one of which is adapted to be fastened onto a separate one of said opposed rod ends protruding through said duct wall holes, said fastener being adapted to exert a longitudinally inwardly directed force against an outer wall surface of said duct wall to thereby press said duct wall against said flange wall of said abutment structure.

2. The reinforcement tie rod of claim 1 wherein said outer transverse flange wall of said abutment structure is further defined as protruding radially outwardly of said tubular portion of said abutment structure.

3. The reinforcement tie rod of claim 2 wherein said outer transverse flange wall of said abutment structure is further defined as including a radially inwardly located transition section which flares arcuately inwardly and axially rearwardly to join said bore, thereby forming a tapered annular cavity between said outer transverse flange wall and said rod.

4. The reinforcement tie rod of claim 3 further including a pair of O-rings, one each received by each opposite end of said rod and adapted to be pressed partially into said annular cavity of said abutment structure by an inner wall surface of an adjacent one of said duct walls when said outer wall surface of said duct wall is pressed against by said external fastener.

5. The reinforcement tie rod of claim 4 wherein said ends of said rod protruding through said duct walls are further defined as being externally threaded.

6. The reinforcement tie rod of claim 5 wherein said external fastener is further defined as having internal threads adapted to threadingly receive said rod end.

7. The reinforcement tie rod of claim 4 wherein each of said abutment structures is further defined as being fastened to said rod by inner wall portions of said tubular portion of said abutment structure deformed into grooves between threads of said rod by crimps formed in the outer wall surface of said tubular portion.

8. The reinforcement tie rod of claim 7 wherein said bore of said tubular portion of said abutment structure is further defined as being smooth.

9. The reinforcement tie rod of claim 7 wherein said bore of said tubular portion of said abutment structure is further defined as having internal threads adapted to threadingly receive said rod end.

10. The reinforcement tie rod of claim 9 wherein each of said abutment structures is further defined as being fastened to said rod by inner wall portions of said tubular portion of said abutment structure deformed into grooves between threads of said rod by crimps formed in the outer wall surface of said tubular portion.

11. A reinforcement tie rod for restraining relative movement between a pair of opposed walls of a ventilating duct, said walls being provided with a pair of opposed vertically aligned perforations therethrough, said reinforcement tie rod comprising;

a. an elongated rod having external threads on at least opposite longitudinal end portions thereof, said opposite end portions being adapted to be received through respective ones of said vertically aligned perforations provided through said duct walls, b. a pair of abutment structures fastened to said opposite longitudinal end portions of said rod longitudinally inwardly of opposite transverse end walls of said rod, each of said abutment structures including a tubular portion and a flange portion located longitudinally outwardly of said tubular portion, said abutment structure including a bore therethrough having a wall surface which flares radially and longitudinally outwardly to join a transversely disposed, longitudinally outwardly located wall of said flange, said flared portion of said bore wall being arcuately curved to form a tapered annular cavity between said outer transverse flange wall and said rod, the longitudinal spacing between said outer transverse flange walls approximating that of perpendicular spacing between said duct walls, and c. a pair of internally threaded fasteners, a separate one of which is adapted to be threadingly fastened onto a separate one of said rod ends protruding through said duct wall perforations, each said fastener being tightenable against an outer wall surface of said duct to thereby press said duct wall into contact with said outer flange wall surface of said abutment structure.

12. The reinforcement tie rod of claim 11 further including a pair of O-rings, one each received by a separate one of said opposite end portions of said rod and adapted to be pressed partially into said tapered annular cavity of said abutment structure by an adjacent one of said duct walls in response to said fastener being tightened against said outer surface of said duct wall.

13. The reinforcement tie rod of claim 11 wherein said tubular portions of said abutment structures are further defined as being crimped onto said rod.

14. The reinforcement tie rod of claim 11 wherein said tubular portions of said abutment structures are further defined as having internal threads adapted to threadingly receive said rod.

15. The reinforcement tie rod of claim 14 wherein said abutment structures are further defined as being crimped onto said rod.

16. A reinforced ventilating duct including;

a. an elongated tubular body including a pair of opposed walls, said walls being provided through the thickness dimension thereof with a pair of opposed perpendicularly aligned holes, b. an elongated reinforcement tie rod, said rod having opposed longitudinal ends adapted to be received through respective ones of said perpendicularly aligned holes and protrude outwardly therefrom, c. a pair of abutment structures fastened to respective opposed ends of said tie rod, each of said abutment structures having a flange including an outer transverse flange wall adapted to abut an inner wall surface of a respective one of said opposed duct walls, said abutment structure including a tubular portion located longitudinally inwardly of said flange, said tubular portion having a bore which extends through said flange and receives therethrough said rod, and d. a pair of external fasteners, a separate one of which is adapted to be fastened onto a separate one of said opposed rod ends protruding through said duct wall holes, said fastener being adapted to exert a longitudinally inwardly directed force against an outer wall surface of said duct wall to thereby press said duct wall against said flange wall of said abutment structure.

17. The reinforced ventilating duct of claim 16 wherein said outer transverse flange wall of said abutment structure is further defined as protruding radially outwardly of said tubular portion of said abutment structure.

18. The reinforced ventilating duct of claim 17 wherein said outer transverse flange wall of said abutment structure is further defined as including a radially inwardly located transition section which flares arcuately inwardly and axially rearwardly to join said bore, thereby forming a tapered annular cavity between said outer transverse flange wall and said rod.

19. The reinforced ventilating duct of claim 18 further including a pair of O-ring rings, one each received by each opposite end of said rod and adapted to be pressed partially into said annular cavity of said abutment structure by an inner wall surface of an adjacent one of said duct walls when said outer wall surface of said duct wall is pressed against by said external fastener.

20. The ventilating duct of claim 19 wherein said ends of said rod protruding through said duct walls are further defined as being externally threaded.

21. The ventilating duct of claim 20 wherein said external fastener is further defined as having internal threads adapted to threadingly receive said rod end.

22. The ventilating duct of claim 19 wherein each of said abutment structures is further defined as being fastened to said rod by inner wall portions of said tubular portion of said abutment structure deformed into grooves between threads of said rod by crimps formed in the outer wall surface of said tubular portion.

23. The ventilating duct of claim 22 wherein said bore of said tubular portion of said abutment structure is further defined as being smooth.

24. The ventilating duct of claim 22 wherein said bore of said tubular portion of said abutment structure is further defined as having internal threads adapted to threadingly receive said rod end.

25. The ventilating duct of claim 24 wherein each of said abutment structures is further defined as being fastened to said rod by inner wall portions of said tubular portion of said abutment structure deformed into grooves between threads of said rod by crimps formed in the outer wall surface of said tubular portion.

* * * * *